(12) United States Patent
Abadeer et al.

(10) Patent No.: US 8,562,210 B2
(45) Date of Patent: Oct. 22, 2013

(54) THERMAL SENSOR FOR SEMICONDUCTOR CIRCUITS

(75) Inventors: Wagdi W. Abadeer, Jericho, VT (US); Lilian Kamal, legal representative, Saratoga, CA (US); Cathryn J. Christiansen, Huntington, VT (US); John A. Fifield, Underhill, VT (US); Dimitris P. Ioannou, Burlington, VT (US); Tom C. Lee, Essex Junction, VT (US)

(73) Assignee: International Business Machines Corporation, Armonk, NY (US)

(*) Notice: Subject to any disclaimer, the term of this patent is extended or adjusted under 35 U.S.C. 154(b) by 358 days.

(21) Appl. No.: 12/950,508

(22) Filed: Nov. 19, 2010

(65) Prior Publication Data
US 2012/0128033 A1    May 24, 2012

(51) Int. Cl.
G01K 7/01 (2006.01)
G01K 7/14 (2006.01)
G01K 7/16 (2006.01)
G01K 7/21 (2006.01)

(52) U.S. Cl.
USPC ........... 374/185; 374/170; 374/178; 374/114; 374/172; 702/130; 327/513

(58) Field of Classification Search
USPC ......... 374/100, 114, 141, 170, 178, 171–172, 374/183, 185; 702/130, 132–136; 327/512, 327/513
See application file for complete search history.

(56) References Cited

U.S. PATENT DOCUMENTS

| | | | | |
|---|---|---|---|---|
| 3,612,535 A | * | 10/1971 | Davis et al. | 273/238 |
| 4,023,094 A | * | 5/1977 | Adams | 324/610 |
| 4,332,081 A | * | 6/1982 | Francis | 29/612 |
| 4,637,736 A | * | 1/1987 | Andeen et al. | 374/45 |
| 5,053,605 A | * | 10/1991 | Thorax et al. | 219/501 |
| 5,085,526 A | * | 2/1992 | Sawtell et al. | 374/101 |
| 5,140,279 A | * | 8/1992 | Scott, III | 330/156 |
| 5,324,112 A | * | 6/1994 | Palazzetti et al. | 374/109 |
| 5,351,010 A | * | 9/1994 | Leopold et al. | 324/704 |
| 5,601,363 A | * | 2/1997 | Keil et al. | 374/45 |
| 5,696,543 A | * | 12/1997 | Koizumi et al. | 347/17 |
| 5,835,553 A | * | 11/1998 | Suzuki | 377/25 |
| 6,232,618 B1 | | 5/2001 | Wienand et al. | |
| 6,434,504 B1 | | 8/2002 | Eryurek et al. | |
| 6,449,574 B1 | | 9/2002 | Eryurek et al. | |
| 6,519,546 B1 | | 2/2003 | Eryurek et al. | |
| 6,562,185 B2 | | 5/2003 | Avanzino et al. | |
| 6,692,145 B2 | * | 2/2004 | Gianchandani et al. | 374/185 |
| 6,717,457 B2 | * | 4/2004 | Nanba et al. | 327/513 |
| 6,991,367 B2 | | 1/2006 | Adlerstein | |
| 7,416,329 B2 | * | 8/2008 | Severson | 374/16 |
| 7,988,354 B2 | * | 8/2011 | Jansen | 374/170 |
| 8,092,084 B2 | * | 1/2012 | Riddle et al. | 374/185 |
| 2005/0012588 A1 | * | 1/2005 | Sultan et al. | 338/25 |
| 2011/0080933 A1 | * | 4/2011 | Rivero | 374/178 |
| 2012/0275484 A1 | * | 11/2012 | Hayashi et al. | 374/1 |

\* cited by examiner

*Primary Examiner* — Gail Verbitsky
(74) *Attorney, Agent, or Firm* — Scully, Scott, Murphy & Presser, P.C.; Richard M. Kotulak, Esq.

(57) ABSTRACT

A system and a method for measuring temperature within an operating circuit use a Wheatstone bridge within a temperature sensing circuit. One of the resistors in the Wheatstone bridge is a thermally sensitive resistive material layer within the operating circuit. The other three resistors are thermally isolated from the operating circuit. Particular configurations of NFET and PFET devices are used to provide enhanced measurement sensitivity within the temperature sensing circuit that includes the Wheatstone bridge.

14 Claims, 10 Drawing Sheets

EXPANDED SCALE OF PFET GATE CURRENT VERSUS
GATE VOLTAGE IN ACCUMULATION RANGE

FIG. 10

EXPANDED SCALE OF NFET GATE CURRENT VERSUS
GATE VOLTAGE IN ACCUMULATION RANGE

NFET PERCENT CHANGE IN GATE CURRENT vs INCREASE
OF GATE VOLTAGE FROM VALUE OF -1.1V

FIG. 13

GRAPHICAL REPRESENTATION OF SOLVING EQUATION (8) FOR DETERMINING GATE CURRENT

FIG. 14

GRAPHICAL REPRESENTATION OF SOLVING EQUATION (8), WITH AN EXPANDED Vg SCALE ON THE X-AXIS

FIG. 15

MAGNITUDE OF NFET GATE VOLTAGE versus DVo

FIG. 16

MAGNITUDE OF NFET GATE VOLTAGE versus ΔT

FIG. 17

SENSE VOLTAGE VERSUS versus ΔT

FIG. 18

THERMAL SENSOR FOR SEMICONDUCTOR CIRCUITS

BACKGROUND

The disclosure relates to temperature measurement within semiconductor circuits. More particularly, the disclosure relates to in-situ temperature measurement within semiconductor circuits.

Among other considerations that influence operation of microelectronic circuits, including operating voltages and operating currents, also of considerable interest and influence within the context of semiconductor circuits is operating temperatures. Operating temperatures within semiconductor circuits may often have a dramatic influence upon semiconductor circuit performance since local operating temperature differences within semiconductor circuits may be particularly high.

While operating temperature is of considerable importance within microelectronic circuit and semiconductor circuit operation, operating temperature is nonetheless not entirely without problems within the context of microelectronic circuit and semiconductor circuit operation. In that regard, accurate operating temperature measurement is often of considerable difficulty within the context of in-situ temperature measurement within microelectronic circuits, and in particular within semiconductor circuits.

To that end, desirable are systems and methods that provide for efficient and accurate measurement of microelectronic circuit temperatures and semiconductor circuit temperatures.

SUMMARY

The structures and methods disclosed herein include a temperature sensing circuit and a method for accurately measuring true operating temperature, over a broad range, at any position on a chip, and at any metal level (or other location or level) of an integrated circuit structure, while using the temperature sensing circuit when operating an operating circuit within the integrated circuit structure. In one embodiment, the foregoing object is realized by placing a thermally sensitive resistive material layer at the location of the metal level (or other location) where an operating temperature measurement is desired. This thermally sensitive resistive material layer with a particular resistance (i.e., designated most specifically as R4 within this disclosure) is connected through chip interconnects to test pads (which are not otherwise illustrated) for accessibility. The thermally sensitive resistive material layer of the particular resistance R4 is connected to the remainder of a sensing and measurement circuit according to either one of two possible configurations that are shown within particular drawing figures that follow. With the exception of the thermally sensitive resistive material layer of the particular resistance R4, all other circuit elements are generally outside the chip (which contains the operating circuit) where the R4 resistance thermally sensitive resistive material layer is placed for temperature sensing. It is possible to place some other elements of the circuit on the same chip or substrate as the R4 thermally sensitive resistive material layer given that the temperature of those elements is known and fairly constant, i.e. does not change with power on conditions of the chip.

Figure 1:
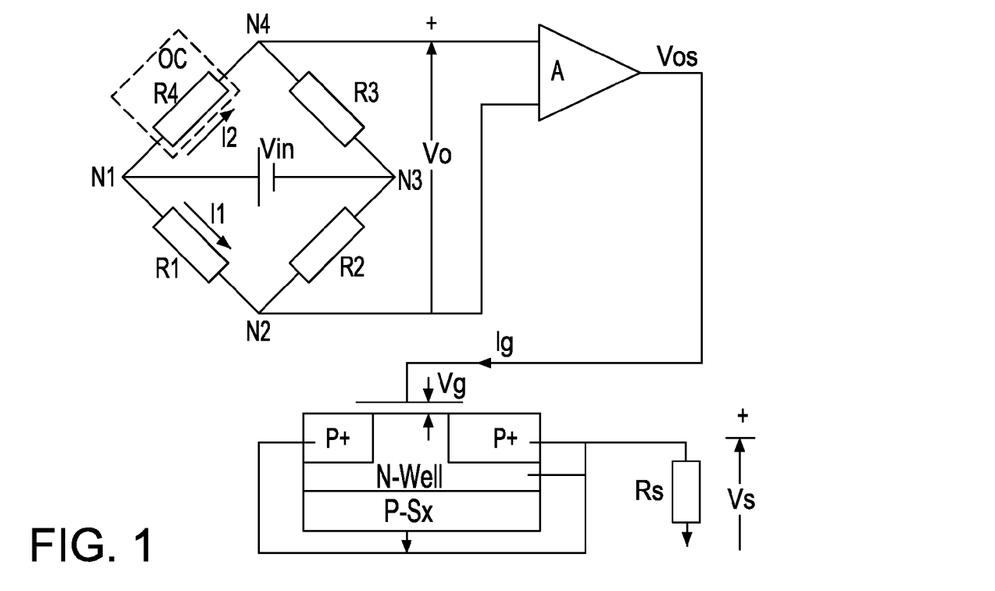
FIG. 1 shows, for an exemplary embodiment, a circuit configuration with PFET in accordance with the disclosure.
Figure 2:
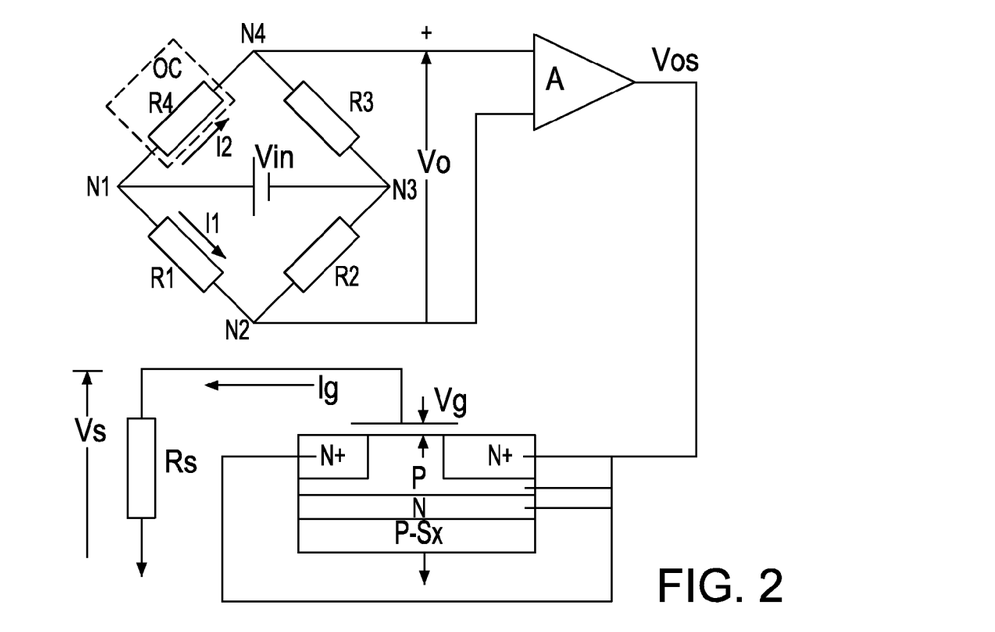
FIG. 2 shows, for an exemplary embodiment, a circuit configuration with NFET in accordance with the disclosure.

Particular circuits within the context of the disclosure are shown in FIG. 1 and FIG. 2, comprising in-part Wheatstone Bridge circuits. The remainder of the Summary is more clearly understood when read within the context of FIG. 1 and FIG. 2.

A particular temperature sensing circuit in accordance with at least one embodiment of the invention includes a first resistor connected to a first node and to a second node. The particular temperature measuring circuit also includes a second resistor connected to the second node and to a third node. The particular temperature measuring circuit also includes a third resistor connected to the third node and to a fourth node. The particular temperature measuring circuit also includes a fourth resistor connected to the fourth node and to the first node. One pair of the first node/third node and the second node/fourth node is adapted for receiving an input voltage and the other pair of the first node/third node and second node/fourth node is adapted for providing an output voltage. One of the first resistor, second resistor, third resistor and fourth resistor comprises a thermally sensitive resistive material (i.e., a material whose resistance changes as a function of temperature) within the operating circuit and the other three of the first resistor, the second resistor, the third resistor and the fourth resistor are thermally isolated from the operating circuit.

Within the context of the foregoing circuit, "thermally isolated" may provide that the thermally sensitive resistive material layer is physically separated from the remaining resistors and located over a separate substrate. Alternatively, all resistors may be located over a single substrate, but including a thermal blocking material layer or a thermal separation distance interposed between the thermally sensitive resistive material layer and the remaining resistors.

A particular method for measuring temperature within operating a circuit in accordance with the disclosure while using the temperature sensing circuit includes providing the foregoing temperature sensing circuit. The method also includes applying an input voltage between one pair of the first node/third node and the second node/fourth node with the operating circuit not operating. The input voltage generates a first output voltage at the other pair of the first node/third node and the second node/fourth node. The method also includes applying an input voltage between one pair of the first node/third node and the second node/fourth node with the operating circuit operating. The input voltage generates a second output voltage at the other pair of the first node/third node and the second node/fourth node. The method also includes correlating the first output voltage and the second output voltage to determine a change in temperature of the thermally sensitive resistive material layer within the operating circuit when operating the operating circuit.

Also included within the context of the foregoing circuit and method are amplifier components that include field effect transistor devices specifically configured to provide enhanced surface charge accumulation and enhanced sensitivity.

BRIEF DESCRIPTION OF THE DRAWINGS

The objects, features and advantages of the disclosure are understood within the context of the Description of the Preferred Embodiment, as set forth below. The Description of the Preferred Embodiment is understood within the context of the accompanying drawings, that form a material part of this disclosure, wherein.

DESCRIPTION OF THE PREFERRED EMBODIMENT

The disclosure, which includes a plurality of temperature sensing circuits (i.e., measurement circuits) and a method for measuring a temperature within an operating circuit when operating the operating circuit and using the temperature sensing circuit, is understood within the context of the Description set forth below. The Description set forth below is understood within the context of the drawings described above.

The temperature sensing circuits in accordance with the disclosure are shown in FIG. 1 and FIG. 2. The temperature sensing circuits include a Wheatstone bridge, which has as circuit elements the four resistors R1, R2, R3 and R4 that are arranged in a rectangular fashion and separated by the nodes N1, N2, N3 and N4. As is illustrated within the schematic circuit diagrams of FIG. 1 and FIG. 2, the resistor R1 is located between nodes N1 and N2, the resistor R2 is located between nodes N2 and N3, the resistor R3 is located between nodes N3 and N4 and the resistor R4 is located between nodes N4 and N1. As is illustrated within the schematic circuit diagram of FIG. 1 and FIG. 2, the resistor R4 is located within an operating circuit OC and intended as comprising a resistive material layer in the location of a metal line or other location within the operating circuit OC where a temperature measurement is desired. Within FIG. 1 and FIG. 2, the input to the bridge circuit is Vin (i.e., between N1 and N3) and the output voltage of the bridge circuit is Vo (i.e., between N2 and N4). Within FIG. 1 and FIG. 2, both an amplifier output voltage Vos and a gate voltage Vg are measured with respect to ground. The particular configurations as illustrated in FIG. 1 and FIG. 2 are intended as consistent with further description below.

Thus, while FIG. 1 and FIG. 2 illustrate particularly designated configurations of the resistors R1, R2, R3 and R4 and the nodes N1, N2, N3 and N4, alternate designations may also be used. Such alternate designations may be used provided that alternate configurations that correspond with those alternate designations provide that four resistors are in a Wheatstone bridge rectangular configuration with opposite pairs of nodes being adapted for input voltage and output voltage, and with one of the resistors comprising a thermally sensitive resistive material layer within an operating circuit whose temperature is desired to be sensed, and the other three of the resistors are thermally isolated from the operating circuit. For example, in the embodiments that are depicted in FIG. 1 and FIG. 2, the resistor identified by R4 is an off-chip resistor. The disclosure is not intended to be limited to this configuration, as other embodiments have been contemplated in which one or resistors R1, R2 and R3 may be an off-chip resistor, and R4 may be an on-chip resistor.

While the circuits of FIG. 1 and FIG. 2 are illustrated within the context of resistors R1, R2, R3 and R4, such resistors are intended to include, and be representative of, other impedance based devices, where one of the impedance based devices is intended as comprising a thermally sensitive resistive material. A "thermally resistive sensitive material" is a resistive material with resistance varying as a function of temperature. A typical material suitable for the thermally sensitive base material would be an aluminum or copper wiring level on an intergrated circuit. In addition to aluminum and copper, other materials are suitable for the thermally sensitive material, so long as they exhibit a resistance change as a function of temperature.

Within the context of FIG. 1 and FIG. 2, the output voltage Vo between nodes 2 and 4 is applied to an input of an isolation op-amp A (or similar device) with unity gain. For the circuit of FIG. 1, the output voltage Vos of the op-amp is applied to the gate of a PFET, whose source, drain and formed N-Well are tied together and connected to an output sense resistor Rs for which the sense voltage Vs is monitored. As designed, the PFET operates in an accumulation mode of the silicon surface and the current Ig into the polysilicon gate of the PFET is a gate tunneling current in the surface accumulation mode. Equally, an NFET could be employed, and again the NFET should operate in the accumulation mode and thus, in this case the circuit configuration will be as shown in FIG. 2.

In FIG. 2, the output voltage Vos of the op-amp is applied to the diffusions of NFET, and the N+ diffusions are tied to the p-well and the N-band. The N-band is to isolate the p-well of the NFET from the p substrate. The gate of the NFET is connected to an output sense resistor Rs for which the sense voltage Vs is monitored.

Within this particular circuit, an NFET is used and the output voltage Vos is applied to the source and drain regions, and surface accumulation occurs at the gate. Thus, a gate current Ig is measured across Rs in FIG. 2. An isolated NFET should be used because the P body potential is desirably positive and hence, an isolated NFET is desirable.

The isolated NFET, is an NFET whose p-well, in vicinity of the N+ diffusions, is isolated from the p-substrate by n-band. This allows applying a positive voltage to both the p-body and the n-band. The p-substrate could be grounded without forward biasing any junctions.

For the Wheatstone bridge, the input voltage Vin causes currents I1 and I2, as shown in FIG. 1 and FIG. 2. The output voltage is given by:

$$Vo=(I1 \times R1)-(I2 \times R4) \quad (1)$$

$$Vo=Vin \times \{[R1/(R1+R2)]-[R4/(R3+R4)]\} \quad (2)$$

$$Vo=Vin \times \{[(R1 \times R3)-(R2 \times R4)]/[(R1+R2) \times (R3 \times R4)]\} \quad (3)$$

In one embodiment, an increase in temperature is monitored over a broad range, above room temperature of 27° C., at position of R4, as a test chip (which contains the operating circuit) goes from power "OFF" to power "ON." Another objective is that the minimum change in temperature to be detected is 5° C. For simplicity, but not a necessary condition for operation, it is chosen here that R4=R3 and R2 is an adjustable resistor. Vin may be in the range of 3.0 to 3.6V, and for demonstration purposes, a value of 3.6V is chosen here. The lowest value of Vin is chosen to have enough detection sensitivity for the change in output voltage with temperature change in R4, and the highest value of Vin is such that self-heating in the resistor R4 is avoided. The Wheatstone bridge is initially balanced, with test chip at power "OFF," at room temperature of 27° C., by varying R2 to obtain a specific initial value for Vo. This initial value could be in the range of 1.2V to 1.5V, and for demonstration purposes, a value of 1.4V is chosen here. Next the test chip including the operating circuit OC is powered "ON," and after the temperature is allowed to stabilize, a new value of output voltage Vo is measured, which will be different from the initial value due to rise in temperature of R4. As will be shown shortly, the change in output voltage Vo is directly related to temperature change in R4.

The change in Vo due to change in temperature of R4 is given by:

$$DVo=Vo(27°\,C.+\Delta T)-Vo(27°\,C.) \quad (4)$$

Where ΔT is the rise in temperature above 27° C. (or an alternative suitable baseline temperature) after the test chip is powered "ON". As an example, with ΔT of a minimum value of 5° C., the change DVo should cause sufficient change in the sense voltage Vs across the sense resistor Rs. At or above room temperature, R4 is given by:

$$R4(T)=(\rho \times L/W)+(\Delta T \times TCR) \quad (5)$$

and, $$R4(T)=R4(27°\,C.)+\Delta R4 \quad (6)$$

where TCR is the fraction temperature coefficient of resistance for R4. TCR depends on the metallurgy of R4, typical range is 0.0022 to 0.003/° C. ρ is the sheet resistance at 27° C., which also depends on the metallurgy and a typical range is 0.084 to 0.345 Ohm/Square. The lower range of ρ applies to metal lines with relatively higher allowed minimum line width while the higher range of ρ is valid for more scaled technologies with lower allowed minimum line width. A consideration is that for any temperature of interest, the total interconnect resistance from R4 to a plurality of test pads (i.e., not shown) on the test chip that includes the operating circuit should be negligible compared to the value of R4. This interconnect resistance is usually dominated by a via resistance (Rv) for a plurality of vias that is included within an interconnect structure. Scaled CMOS technologies with lower value for the allowed minimum metal line width represents the worst case for the interconnect resistance, since under such circumstances both a via resistance and a line resistance contribute to an interconnect resistance.

Figure 3:
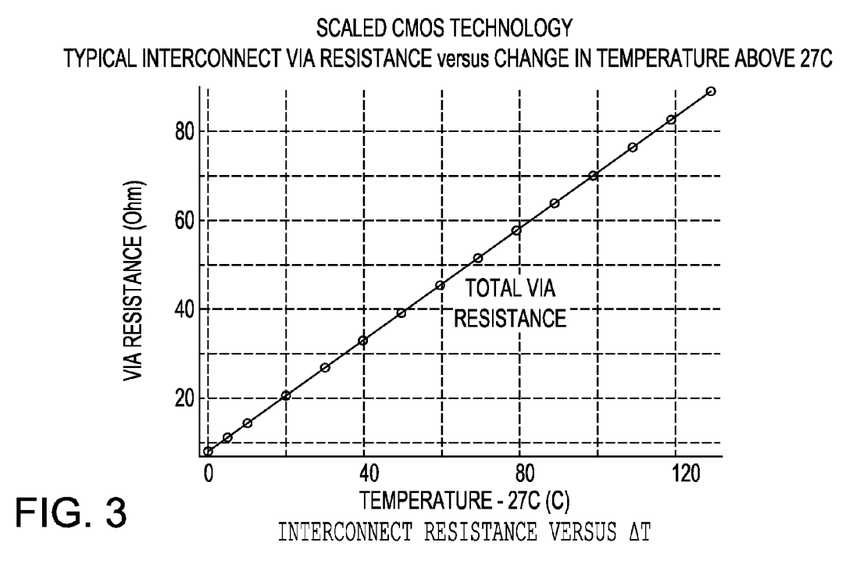
FIG. 3 shows, for an exemplary embodiment, a graph of Interconnect Resistance versus ΔT.

FIG. 3 shows a typical plot for the worst case, where the interconnect resistance of a typical scaled CMOS technology is plotted as function of increase in temperature above 27° C. This graph shows that at ΔT of 100° C., Rv is in the order of 70 Ohm. Thus a requirement is set for the operation that Rv to be only 1% of R4 at any temperature. This provides that R4 (127° C.) should be at least 7000 Ohm. From equation (5), and the typical values given above, this provides that R4 (27° C.) should be about 5742 Ohm. With the typical values given above for ρ this value of R4 could be achieved with a metal line of total area of about 570 um² which is accessible within manufacturing considerations. The area required for R4 could be reduced by employing different line metallurgy, which is normally used to form resistors such as tantalum nitride and the like. For such cases, ρ is significantly higher, and thus less area is needed to achieve a certain line resistance. IN some embodiments, the drawback for such case is the lower TCR, but as will be seen below, the technique employed in the present disclosure achieves a superior sensitivity in comparison with conventional methods.

As indicated above, the operation of the circuit disclosed herein is demonstrated, for the case of R4=R3. In this case, R2 is related to R1 as follows:

$$R2=R1 \times [1-(2 \times Vx)]/[1+(2 \times Vx)] \quad (7)$$

where Vx=Vo(27° C.)/Vin. The change in output voltage DVo is given by:

$$DVo=-Vin \times \Delta T \times TCR/[4+(2 \times TCR \times \Delta T)] \quad (8)$$

Figure 4:
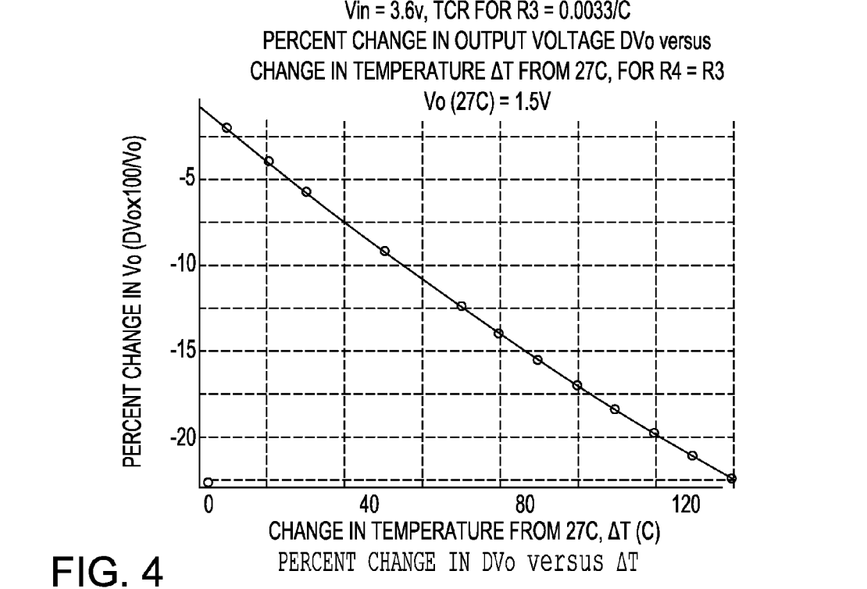
FIG. 4 shows, for an exemplary embodiment, a graph of Percent Change in DVo versus ΔT.
Figure 5:
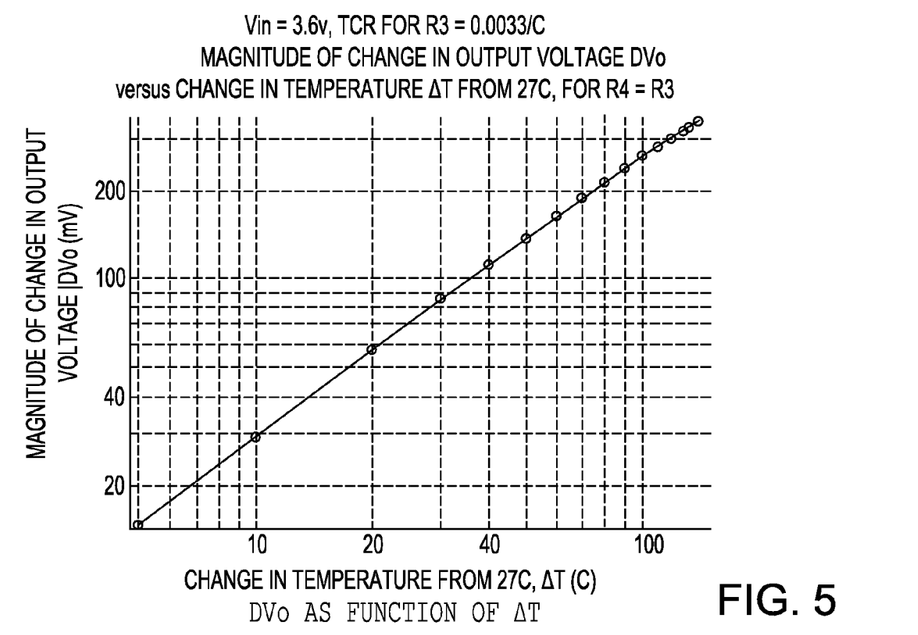
FIG. 5 shows, for an exemplary embodiment, a graph of DVo versus ΔT.
Figure 6:
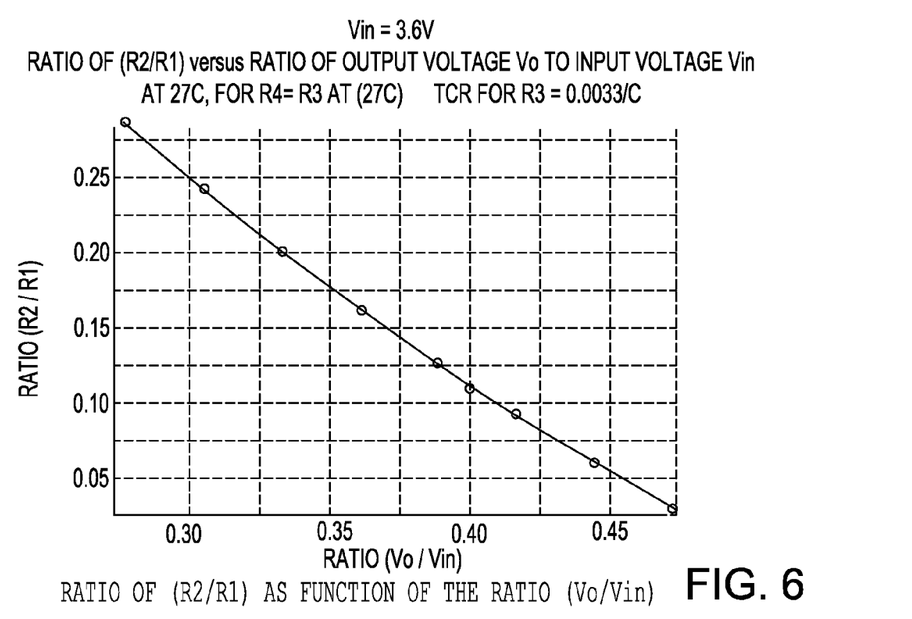
FIG. 6 shows, for an exemplary embodiment, a graph of Ratio of (R2/R1) as a function of the Ratio of (Vo/Vin).

Equation (8) provides that under the assumption of R4=R3, DVo is not function of the value of any of the resistors in the Wheatstone bridge. FIG. 4 shows percent change in DVo as function of ΔT. FIG. 5 shows change in ΔVo as function of ΔT, for the case of Vin=3.6V and TCR=0.0033/° C. FIG. 6 shows the ratio of (R2/R1) as function of the ratio (Vo/Vin).

As shown in FIG. 4, even with an increase in temperature ΔT of 60° C., above room temperature, there is only about 10% change in the output voltage Vo. For a ΔT of 5° C., the change in Vo is only about 1% which would not be possible to measure by conventional techniques. The methods and structures of this disclosure employ the properties of tunneling current in ultra-thin gate NFETs and PFETs, as shown in FIG. 1 and FIG. 2 to measure small changes in Vo.

Figure 7:
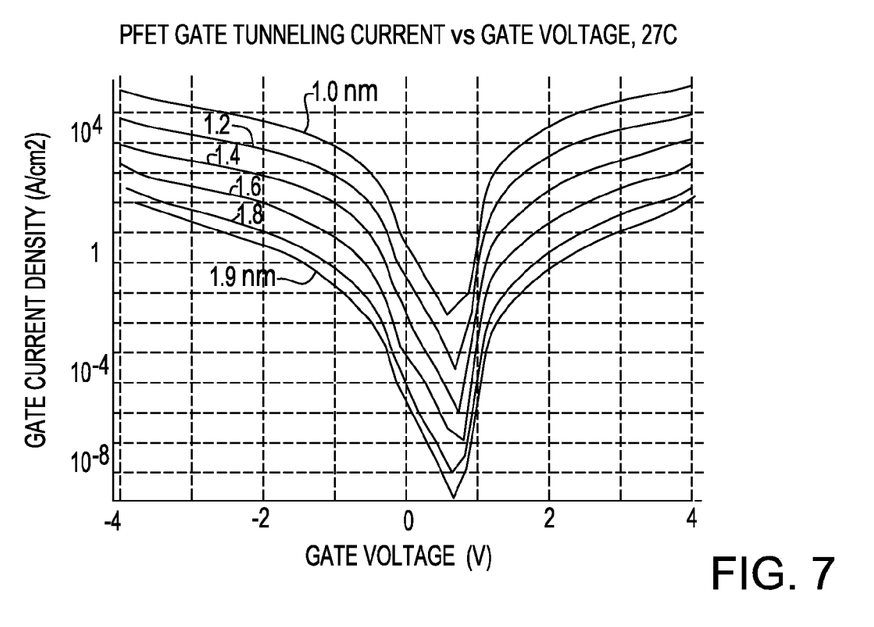
FIG. 7 shows, for an exemplary embodiment, a graph of PFET Gate Tunneling Current Density versus Gate Voltage.
Figure 8:
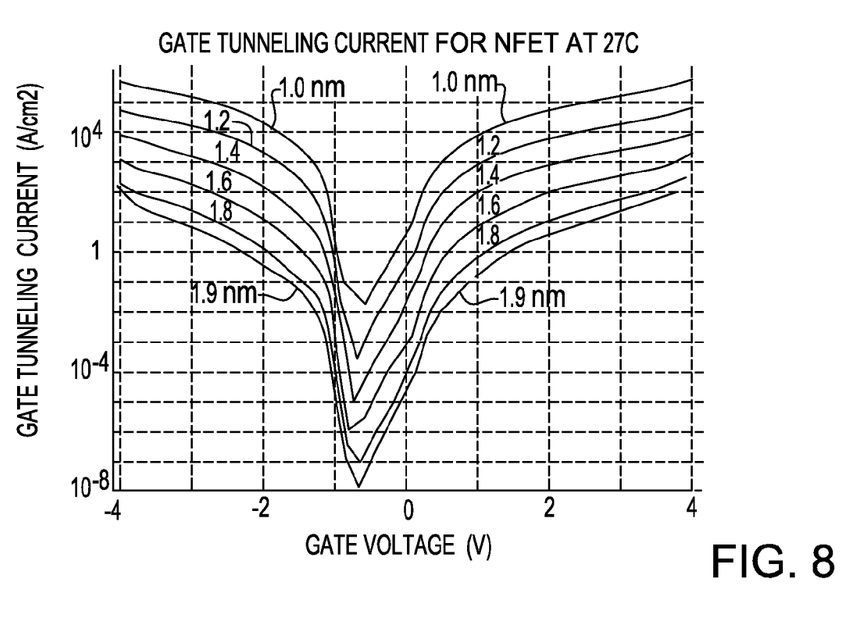
FIG. 8 shows, for an exemplary embodiment, a graph of NFET Gate Tunneling Current Density versus Gate Voltage.

For the circuit with PFET (FIG. 1), the gate tunneling current density versus gate voltage for gate oxide thickness in the range of 1.0 nm to 1.9 nm is shown in FIG. 7. The negative gate voltage on the x-axis refers to the inversion condition where the channel is at a positive potential relative to a poly-silicon gate. For the inversion condition, the gate current is away from the silicon channel. Positive gate voltage in FIG. 7 refers to negative silicon surface potential relative to the gate and this condition is for silicon surface accumulation where the gate current is into the silicon channel. For the employment of NFET (FIG. 2) in the circuit, the polarity of gate voltage is reversed from that for PFET in the accumulation and inversion conditions. The gate current density versus gate voltage for the NFET is shown in FIG. 8.

FIG. 7 shows a minimum of gate current occurring when the gate voltage is biased at the work-function difference voltage of 0.76 volts. When the gate voltage is above the work-function difference of 0.76 volts, the gate current changes rapidly for small changes in gate voltage. In other words, the transconductance, or rate of change of gate current in response
to a change in gate voltage is high for gate voltages above the 0.76 volt work-function difference. Similarly for the NFET example in FIG. 8, when the gate voltage is more negative than the 0.76 volt work-function difference, the rate of change of gate current for a change in gate voltage, or transconductance is high.

Figure 9:
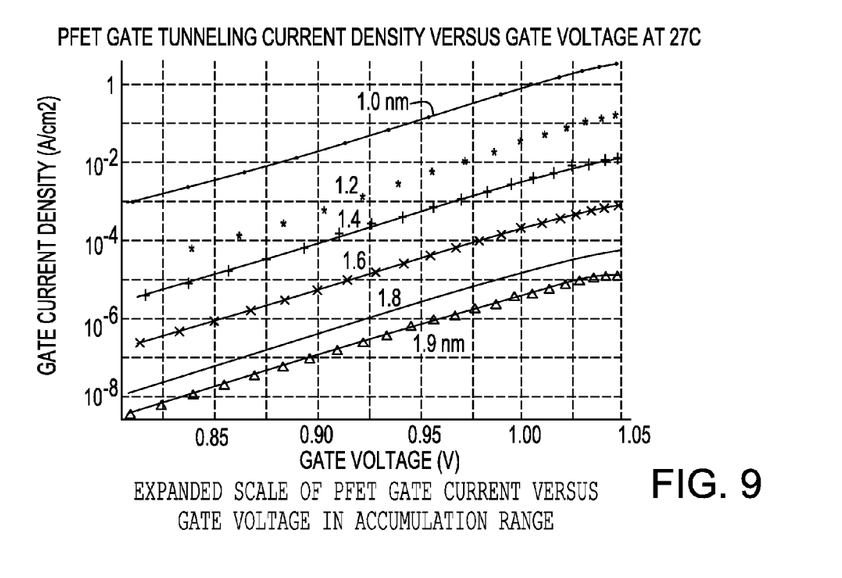
FIG. 9 shows, for an exemplary embodiment, a graph of Expanded Scale of PFET Gate Current versus Gate Voltage in Accumulation Range.
Figure 10:
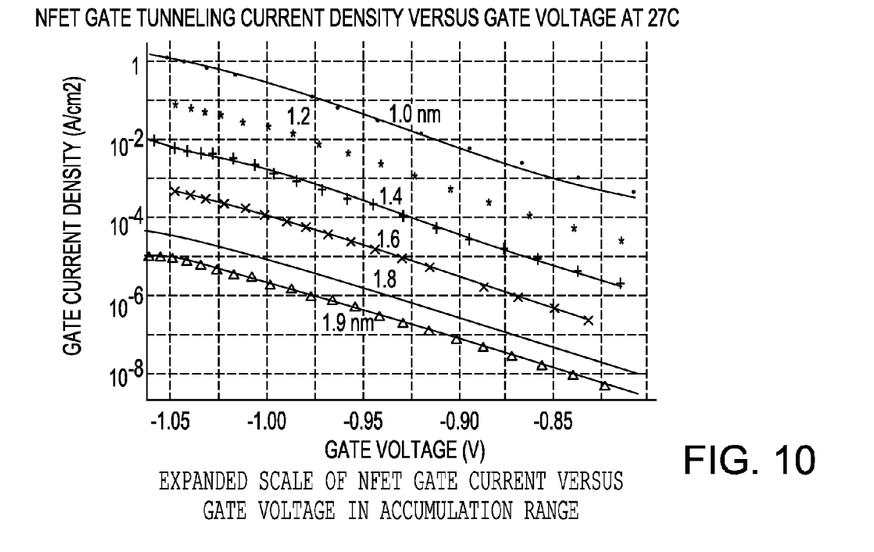
FIG. 10 shows, for an exemplary embodiment, a graph of Expanded Scale of NFET Gate Current versus Gate Voltage in Accumulation Range.

In FIG. 9, the gate voltage is slightly more positive than the value at minimum magnitude of gate current, which is about 0.76V. FIG. 9 shows an expanded scale for the gate current density versus gate voltage in the accumulation range where the gate current is very sensitive to gate voltage. The corresponding data for the NFET is shown in FIG. 10. For the NFET, the accumulation range is with negative gate voltage relative to silicon surface, and FIG. 10 is shown for gate voltages more negative than the value at minimum magnitude of gate current, which is about −0.76V. Again, in that range the gate current is a very sensitive function of gate voltage.

Figure 11:
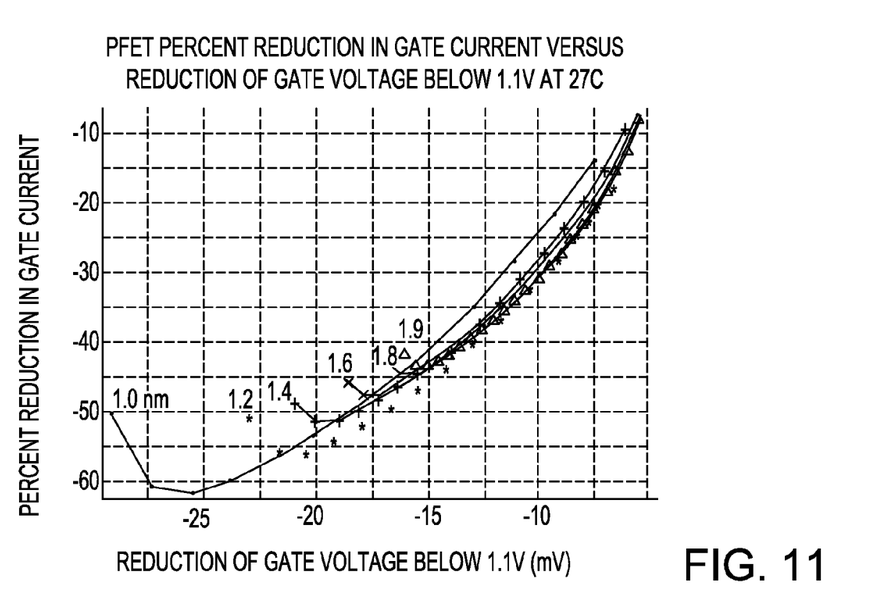
FIG. 11 shows, for an exemplary embodiment, a graph of PFET Percent Change in Gate Current versus Reduction of Gate Voltage from Value of 1.1V.
Figure 12:
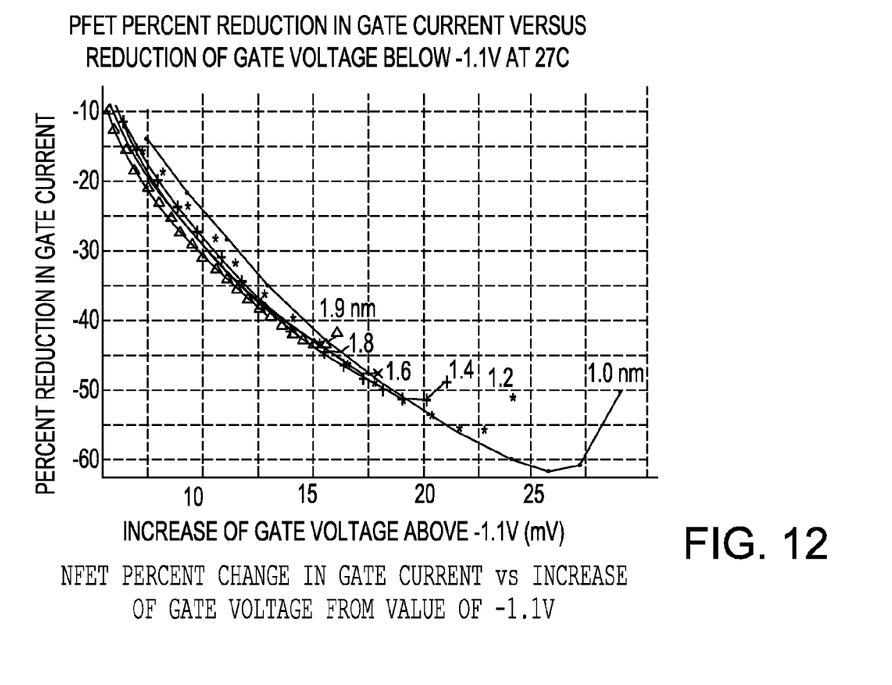
FIG. 12 shows, for an exemplary embodiment, a graph of NFET Percent Change in Gate Current versus increase of Gate Voltage from Value of −1.1V.

For the NFET and PFET cases, the operability of structure consistent with FIG. 1 and FIG. 2 is demonstrated for a gate oxide thickness of 1.4 nm. From FIG. 9 and FIG. 10, for PFET and NFET, respectively, the percent change in gate current was calculated as function of change in gate voltage change from an initial value of 1.1 V in magnitude. The results are shown in FIG. 11 and FIG. 12, for PFET and NFET, respectively. The Initial value of 1.1 V for the gate voltage is consistent with the value of 1.4V for the initial value (27° C.) of voltage Vo, and a voltage drop of 0.3V for the sense voltage. The initial value of 1.4V for Vo was provided above as the value chosen to demonstrate operability. Note that the gate voltage Vg refers to the voltage drop across the gate oxide in the accumulation range, as shown in FIG. 1 and FIG. 2.

From FIG. 11 and FIG. 12, for the above bias of gate voltage in the accumulation range, a change in the magnitude of gate voltage of only 15 mV gives a change in gate current of about 42%. This illustrates the sensitivity of the technique introduced in this disclosure. Also, in one embodiment, the methods and structures disclosed herein are not sensitive to normal process variations in oxide thickness or temperature. In the circuits of FIG. 1 and FIG. 2, the FETs are connected to an output sense resistance Rs through which the gate current Ig flows and generates a sense voltage of Vs. Under such circumstances, the op-amp output voltage to ground Vos, as shown in FIG. 1 and FIG. 2 is essentially equal in magnitude to Vo, and the effective voltage Vg across the gate oxide of the PFET or NFET is given by:

1. $Vg(T)=Vos(T)-Vs(T)$ (9)

Figure 13:
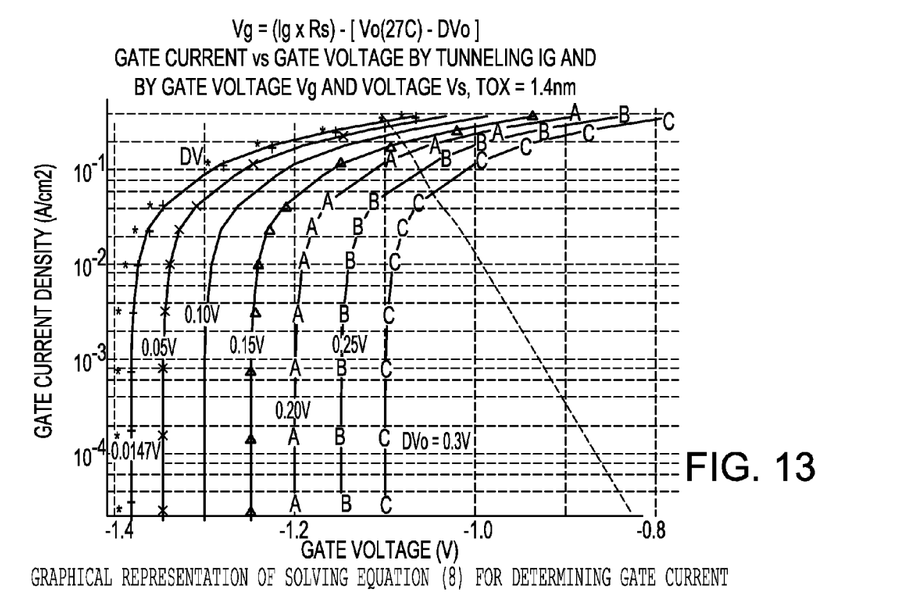
FIG. 13 shows, for an exemplary embodiment, a graph of Equation (8) Solutions for Determining Gate Current Ig.
Figure 14:
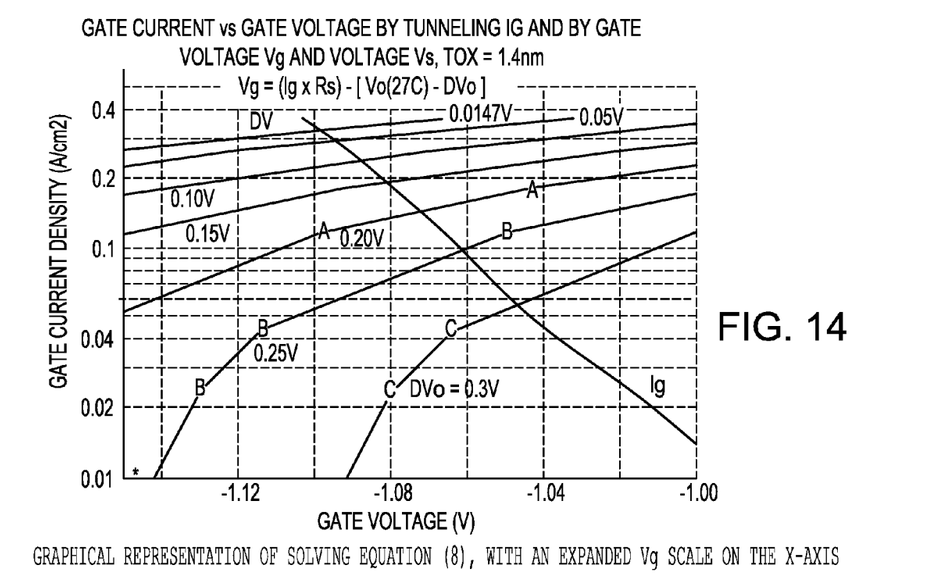
FIG. 14 shows, for an exemplary embodiment, a graph of Equation (8) Solutions for Determining Gate Current Ig, with an expanded Vg Scale on the x-axis.

As indicated above, the operation of the circuit depicted in FIGS. 1 and 2 is demonstrated for a value of 1.4V for Vo (27° C.), which is also equal to Vos (27° C.). Also, the demonstration is for using an NFET as shown in FIG. 2 with Vs (27° C.) of 0.3V, oxide thickness of 1.4 nm, NFET oxide area of 55 $um^2$, and 1.57 Mega ohm for the sense resistor Rs. From equation (8), the gate current Ig of the NFET can be determined. FIG. 13 shows a graphical representation for determining Ig, which is given by the intersection of lines representing the right and left sides of equation (9). Also FIG. 13 shows the cases for different values of DVo as defined in equation (4). FIG. 14 shows the situation with an expanded Vg scale on the x-axis.

Figure 15:
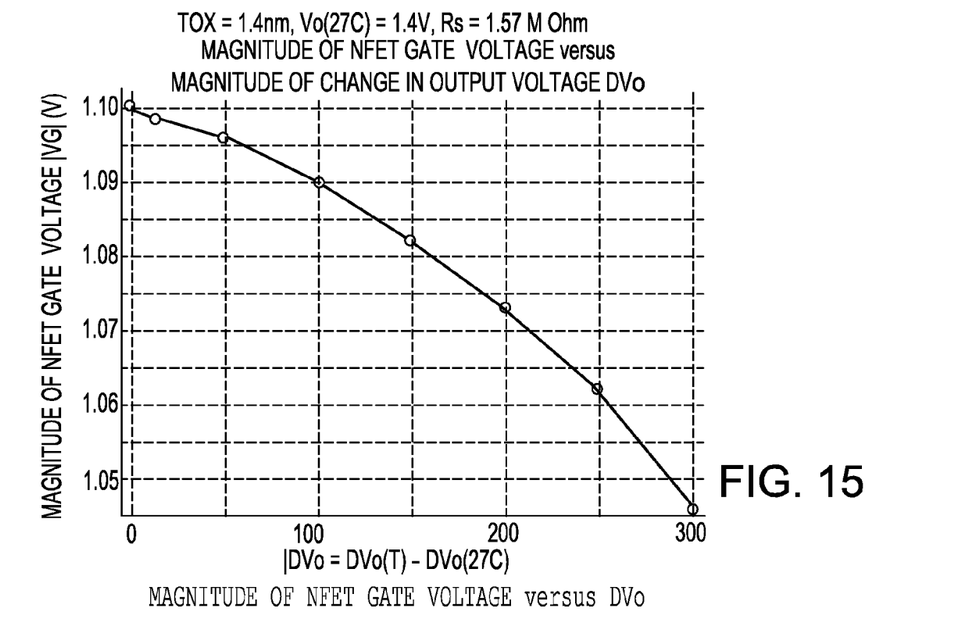
FIG. 15 shows, for an exemplary embodiment, a graph of Magnitude of NFET Gate Voltage versus DVo.
Figure 16:
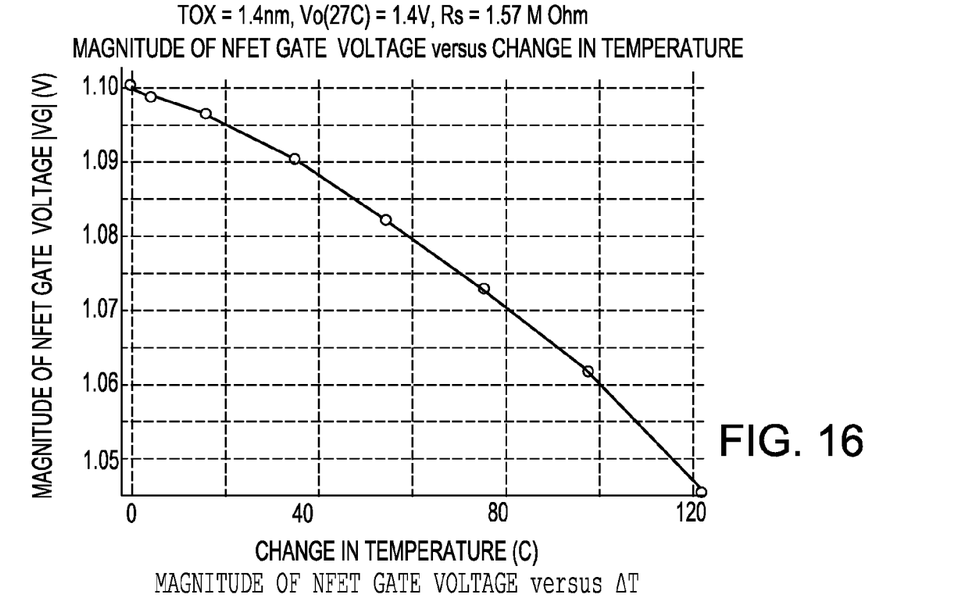
FIG. 16 shows, for an exemplary embodiment, a graph of Magnitude of NFET Gate Voltage versus ΔT.
Figure 17:
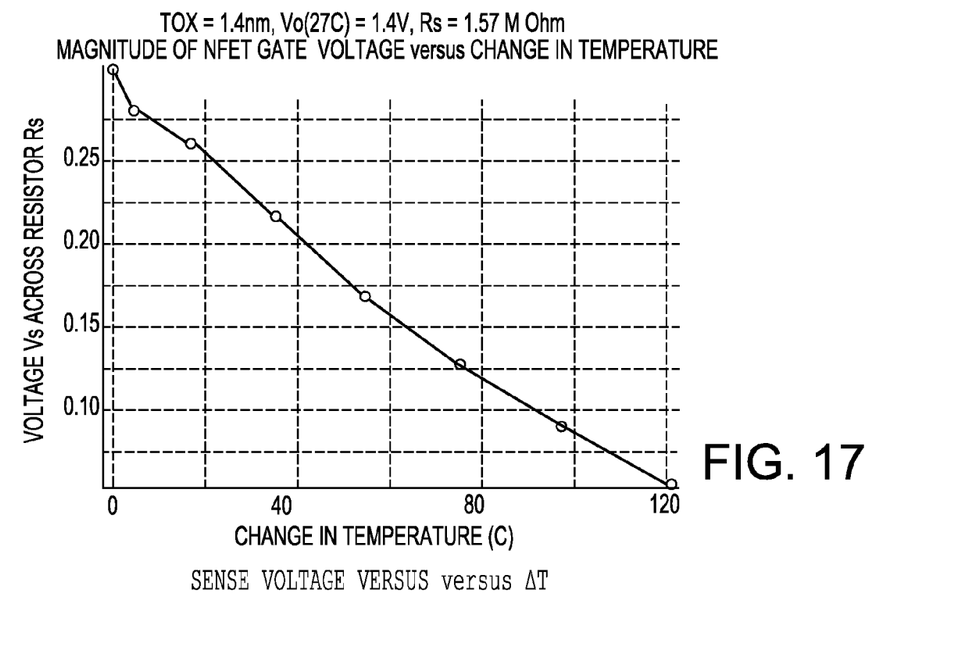
FIG. 17 shows, for an exemplary embodiment, a graph of Sense Voltage versus ΔT.

From the solution of equation (9), the gate voltage Vg was determined as function of DVo, which is shown in FIG. 15. FIGS. 16 and 17, respectively, show Vg versus ΔT which is given by equation (4), and Vs versus ΔT. These results demonstrate the operation of one embodiment of the invention for a wide range of 120° C. for ΔT, which means reaching a temperature of 120° C.+27° C.=147° C. at the position of R4 on the test chip. As shown in FIG. 17, for the range of 120° C. for ΔT, the sense voltage Vs varies from a value of 0.3V at ΔT=0, to a value of 50 mV at ΔT=120° C. Thus, for this range of ΔT, reliable measurements of changes in Vs are made, from which the temperature at the location of resistor R4 on the test chip is determined. The sensitivity of the measurements can be achieved reliably with a value of ΔT as small as 5° C.

Further optimization of the circuits is very possible with respect to values of Rs, oxide thickness and NFET and PFET gate oxide areas. The optimization is done by changing the initial bias point of the Wheatstone bridge at 27° C. [Vo (27° C.)], also the initial bias point of the NFET or PFET in the accumulation range [Vg (27° C.)]. Increasing the magnitude of the initial bias point increases the gate current of the FET and thus decreases the oxide area required, or increases the oxide thickness needed for the FET. This procedure will somewhat decease the magnitude of current change in the FET corresponding to a change of at least 15 mV in the output voltage Vo. Keeping the minimum required change in gate current to 20%, it corresponds to a 15 mV change in initial bias point (Vo). The following Table 1 shows optimization values of the operating conditions. For demonstration purposes, the following is shown for the case with using NFET (FIG. 2). The results apply for a value of Rs kept at 1.57 Mega Ohm and the voltage Vs (27° C.) is also kept at 0.3V. Similar trade-offs can be made with other design parameters such as resistor Rs and sense voltage.

TABLE 1

| Case No. | Initial Bias Vo(27 C.) | Vo(27 C. + 5 C.) = DV | Gate Current Ig μA | Oxide Thickness (nm) | NFET Oxide Area (um$^2$) |
|---|---|---|---|---|---|
| 1 | 1.2 V | −14.7 mV | 0.191 | 1.2 nm | 5243 |
| 2 | 1.2 V | −14.7 mV | 0.191 | 1.4 nm | 128624 |
| 3 | 1.3 V | −14.7 mV | 0.191 | 1.2 nm | 204 |
| 4 | 1.3 V | −14.7 mV | 0.191 | 1.4 nm | 1926 |
| 5 | 1.4 V | −14.7 mV | 0.191 | 1.2 nm | 5.13 |
| 6 | 1.4 V | −14.7 mV | 0.191 | 1.4 nm | 71 |
| 7 | 1.5 V | −14.7 mV | 0.191 | 1.2 nm | 0.81 |
| 8 | 1.5 V | −14.7 mV | 0.191 | 1.4 nm | 11 |
| 9 | 1.5 V | −14.7 mV | 0.191 | 1.6 nm | 143 |
| 10 | 1.5 V | −14.7 mV | 0.191 | 1.9 nm | 6243 |
| 11 | 1.5 V | −14.7 mV | 0.191 | 2.2 nm | 257210 |

Figure 18:
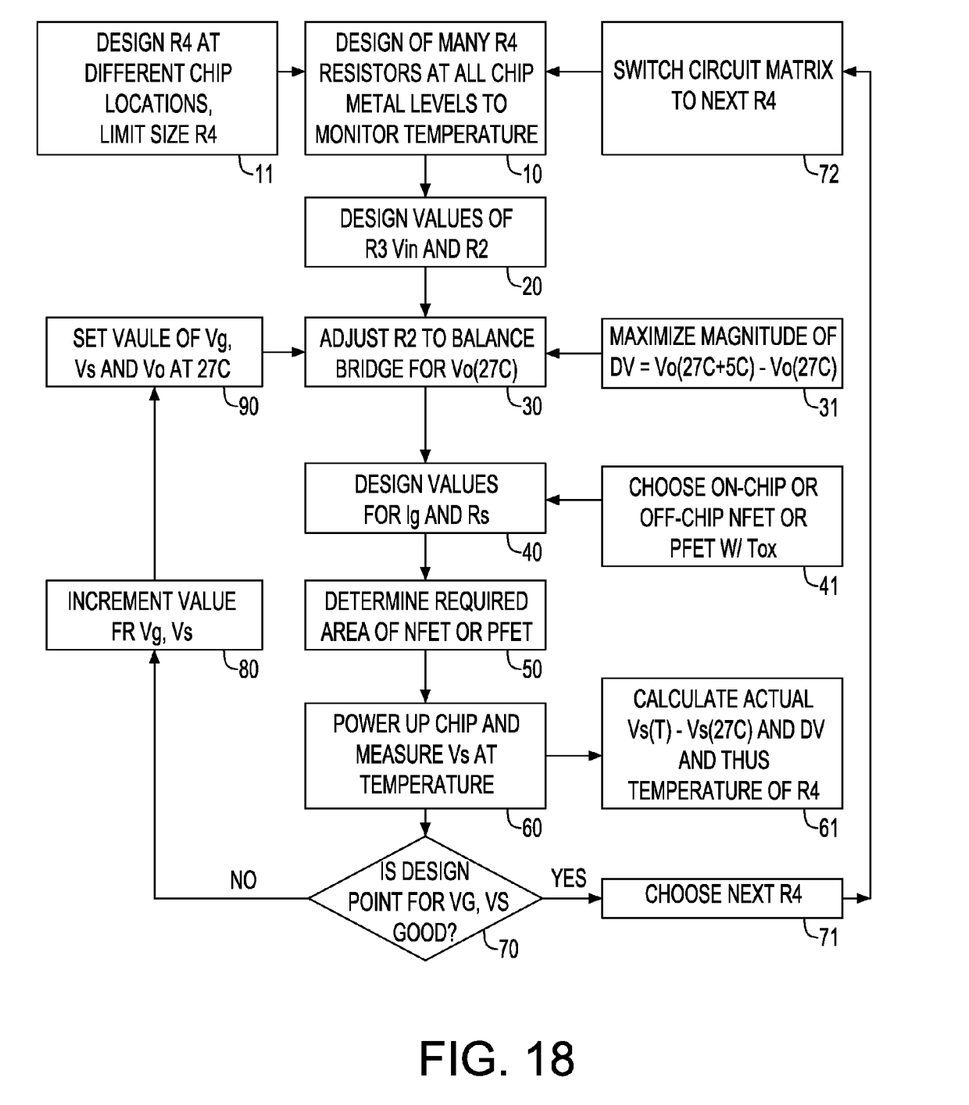
FIG. 18 shows a flow chart for operation.

FIG. 18 is a flow chart for one embodiment of the procedure, for monitoring temperature in various metallization levels.

Step 10 first provides for design of many R4 resistors at many chip levels. Step 11 provides that the size of R4 resistors may be limited. Step 20 provides for design of values of R1, R4 and Vin. Step 30 provides for adjustment of R2 to balance the bridge circuit while step 31 provides for maximizing an output circuit voltage difference. Step 40 provides for designing values of Ig and Rs, while step 41 provides for selection of NFET and PFET sensor circuit elements. Step 50 provides for determining required area for NFET and PFET circuit elements that are selected in step 50. Step 60 provides for a chip power up and output voltage measurement. Inquiry box 70 provides for determination of operating point. A positive response to the inquiry in step 70 provides for restart, through step 71 and step 72, and another design cycle. A negative response to the inquiry in step 70 provides for reconsideration of step 30 and a rebalancing of the Wheatstone bridge.

The preferred embodiment is illustrative of the invention rather than limiting of the invention. Revisions and modifications may be made in structures, dimensions and components in accordance with the preferred embodiment while still providing a system and a method in accordance with the invention, further in accordance with the accompanying claims.

What is claimed is:

1. A temperature sensing circuit for measuring temperature in-situ in an operating circuit comprising:
   a first resistor connected to a first node and to a second node;
   a second resistor connected to the second node and to a third node;
   a third resistor connected to the third node and to a fourth node; and
   a fourth resistor connected to the fourth node and to the first node, where:
   one pair of the first node/third node and second node/fourth node is adapted for receiving an input voltage and the other pair of the first node/third node and second node/fourth node is adapted for providing an output voltage;
   an NFET whose source/drain regions are coupled to the other pair of the first node/third node and second node/fourth node providing the output voltage; and
   a fifth resistor coupled to a gate of the NFET, wherein a voltage across the fifth resistor correlates with and amplifies a temperature change in a thermally sensitive resistive material layer, wherein one of the first resistor, second resistor, third resistor and fourth resistor comprises said thermally sensitive resistive material layer within the operating circuit and the other three of the first resistor, the second resistor, the third resistor and the fourth resistor are thermally isolated from the operating circuit.

2. The circuit of claim 1 wherein the other three of the first resistor, the second resistor, the third resistor and the fourth resistor are located over the same substrate as the operating circuit.

3. The circuit of claim 1 wherein the other three of the first resistor, the second resistor and the fourth resistor are not located over the same substrate as the operating circuit.

4. The circuit of claim 1 further comprising an amplifier adapted for receiving the output voltage.

5. The circuit of claim 1, wherein the NFET is an isolated NFET.

6. The circuit of claim 1, wherein:
   the fourth resistor comprises the metal layer within the operating circuit;
   the third resistor and the fourth resistor have the same value; and
   the second resistor is an adjustable resistor that is used for balancing the circuit.

7. The circuit of claim 6, wherein the first, second and third resistors are maintained at a constant temperature.

8. A method for measuring temperature in an operating circuit comprising:
   providing a temperature sensing circuit that includes:
   a first resistor connected to a first node and to a second node;
   a second resistor connected to the second node and to a third node;
   a third resistor connected to the third node and to a fourth node;
   a fourth resistor connected to the fourth node and to the first node;
   an NFET whose source/drain regions are coupled to the other pair of the first node/third node and second node/fourth node providing the output voltage; and
   a fifth resistor coupled to a gate of the NFET, wherein a voltage across the fifth resistor correlates with and amplifies a temperature change in a thermally sensitive resistive material layer, wherein one of the pair of the first node/third node and second node/fourth node is adapted for receiving an input voltage and the other of the pair of the first node/third node and second node/fourth node is adapted for providing an output voltage; and
   one of the first resistor, second resistor, third resistor and fourth resistor comprises the thermally sensitive resistive material layer within the operating circuit and the other three of the first resistor, the second resistor, the third resistor and the fourth resistor are thermally isolated from the operating circuit;
   applying an input voltage between one pair of the first node/third node and the second node/fourth node with the operating circuit not operating, the input voltage generating a first output voltage at the other pair of the first node/third node and second node/fourth node;
   applying an input voltage between one pair of the first node/third node and the second node/fourth node with the operating circuit operating, the input voltage generating a second output voltage at the other pair of the first node/third node and second node/fourth node; and
   correlating the first output voltage and the second output voltage to determine a change in temperature of the thermally sensitive resistive material layer within the operating circuit when operating the operating circuit.

9. The method of claim 8 wherein the temperature sensing circuit further comprises an amplifier for receiving the output voltage.

10. The method of claim 8, wherein the NFET is an isolated NFET.

11. The method of claim 8, wherein:
    the fourth resistor comprises the thermally sensitive resistive material layer within the operating circuit;
    the third resistor and the fourth resistor have the same value; and
    the second resistor is an adjustable resistor for balancing the circuit.

12. The circuit of claim 11, wherein the first, second and third resistors are maintained at a constant temperature.

13. The method of claim 12, wherein the first, second, and third resistors are located over the same substrate as the operating circuit.

14. The method of claim 12 wherein the first, second and third resistors are not located over the same substrate as the operating circuit.

* * * * *